United States Patent [19]

Bresser

[11] Patent Number: 4,557,558

[45] Date of Patent: Dec. 10, 1985

[54] OPTICAL CABLE ELEMENT

[75] Inventor: Onno R. Bresser, Waddinxveen, Netherlands

[73] Assignee: N.K.F. Groep B.V, Rijswijk, Netherlands

[21] Appl. No.: 452,571

[22] Filed: Dec. 23, 1982

[30] Foreign Application Priority Data

Jan. 14, 1982 [NL] Netherlands ............. 8200126

[51] Int. Cl.⁴ ............................................. G02B 5/14
[52] U.S. Cl. ................................................. 350/96.23
[58] Field of Search ................................. 350/96.23

[56] References Cited

U.S. PATENT DOCUMENTS

| 4,143,942 | 3/1979 | Anderson | 350/96.23 |
| 4,147,407 | 4/1979 | Eichenbaum et al. | 350/96.23 X |
| 4,331,379 | 5/1982 | Oestreich et al. | 350/96.23 |
| 4,396,446 | 8/1983 | Franken | 350/96.23 X |

FOREIGN PATENT DOCUMENTS

| 2723659 | 11/1978 | Fed. Rep. of Germany | 350/96.23 |
| 3108109 | 9/1982 | Fed. Rep. of Germany | 350/96.23 |

OTHER PUBLICATIONS

Krahn, F. et al., "The Manufacture of Optical Cables," *Philips Telecommunication Review*, vol. 37, No. 4, pp. 231-240 (Sep. 1979).

Bresser, O. R., "Metal-Free Optical Fibre Cables," *Philips Telecommunication Review*, vol. 37, No. 4, pp. 251-256 (Sep. 1979).

*Primary Examiner*—John Lee
*Attorney, Agent, or Firm*—Marc D. Schechter

[57] ABSTRACT

An optical cable element having a core and one or more optical fibers. The optical fibers may be provided with a separate secondary coating. The optical fiber or the secondary coating is connected to the core by a permanently elastic adhesive.

18 Claims, 1 Drawing Figure

OPTICAL CABLE ELEMENT

BACKGROUND OF THE INVENTION

The invention relates to an optical cable element having a core and at least one optical fiber which is provided around the core. The cable element may also comprise a separate secondary coating of a synthetic resin.

Such an optical cable element is known, inter alia, from an article by F. Krahn et al. entitled "The manufacture of optical cables" and from an article by O. R. Bresser entitled "Metal-free optical fibre cables" (Philips Telecommunications Review, Volume 37, No. 4, September 1979, pp. 231–240 and pp. 251–256, respectively. The optical cable element known from these references comprises a central core manufactured from an aromatic polyamide synthetic resin of high density. The resin may be, for example, the polyamide synthetic resin known by the tradename of Kevlar.

Six optical fiber are twisted around the core in spiral form on the surface of the core. Each optical fiber has a separate secondary coating provided by an extrusion process. The secondary coating is manufactured from polyvinylidene-difluoride. Within the secondary coating the fiber can move freely.

Polyethylene foil is wound around the cable element. The foil is covered with an extruded synthetic resin sheath of, for example, polyethylene which may be reinforced with glass fiber.

It is stated on page 255 of the article by Bresser that the pulling forces exerted on the cable element, for example upon installation thereof, act on the outside of the element and have to be taken up and compensated for by the core. The secondary coating may not be used to transmit the pulling forces to the central core, so the cable element must be provided with an external strain relieving element.

SUMMARY OF THE INVENTION

It is an object of the invention to provide a cable element which can withstand pulling forces exerted on the outside of the element, without requiring an external strain relieving member.

Another object of the invention is to provide a cable element which can withstand bending forces.

According to still another object, a cable element is provided which can be produced at a high manufacturing speed.

A further object of the invention is to provide a cable element having an improved longitudinal water-tightness.

These objects are achieved with a cable element which the optical fiber, or in the presence of a separate secondary coating the coating, is connected to the core by means of a permanently elastic adhesive.

In one embodiment of the cable element according to the invention, several optical fibers are used, for example six fibers. Optical fibers each having a separate secondary coating are preferred. It is to be noted that the optical fiber always comprises a so-called primary coating of synthetic resin which is provided on the surface of the fiber and protects it from damage.

By means of the invention, as a result of the greatly increased friction between the core and the optical fibers, (or in the case of optical fibers having a separate secondary coating, as a result of the strongly increased friction between the core and the secondary coatings), a pulling force acting on the outside of the cable element is transferred via the fibers or the secondary coatings to the core without damaging the fibers and/or the secondary coatings.

A strong construction is obtained with a clear bond between the fibers or the secondary coatings and the core. As a result of this bond, the linear thermal expansion of the secondary coating will be influenced by the core. With a suitable choice of the core material, for example a core of steel, the expansion of the secondary coating will be inhibited by the core. Thus, the expansion will be in better agreement with the small thermal expansion of the optical fiber. As a result, the cable element according to the invention may be used over a wider temperature range, especialy when the fibers have a separate secondary coating.

In spite of the rigid construction, relative movement of fibers or secondary coatings with respect to the core is possible due to the elasticity of the adhesive. Such movement is mainly in the radial or tangential direction, that is to say a direction at right angles to the longitudinal axis of the core. As a result, the differences in length occurring upon bending the element can be compensated for.

The use of a permanently elastic adhesive according to the invention has the further advantage that upon coupling the cable element to another cable element or to a termination, the various optical fibers do not spread fan-wise so that possible damage is avoided. The fibers or secondary coatings can easily be detached from the layer or adhesive.

Permanently elastic adhesives are well known and are commercially available.

A very suitable adhesive for use in the element according to the invention is a hot melt adhesive, that is to say an adhesive which is provided in the molten state while warm, and solidifies and adheres upon cooling. Examples of useful hot melt adhesives are the known adhesives based on the copolymer poly(ethene-vinyl acetate).

A preferred hot melt adhesive is a pressure sensitive adhesive based on the above-mentioned copolymer.

The core used in the element may be manufactured from metal. It is also possible to use a core of a synthetic resin, for example a polyamide core, or a core of a reinforced synthetic resin, for example an epoxy or polyester core reinforced with glass fibers or polyamide fibers.

In a preferred embodiment of the cable element according to the invention, the adhesive is distributed over the whole surface of the core or over circumferential parts of the surface of the core which are situated at equal distances viewed in the longitudinal direction of the core. In such embodiment, the adhesive obstructs the creepage paths of moisture in the longitudinal direction of the element so that an improved longitudinal watertightness is obtained.

The cable element according to this embodiment can also be manufactured more easily when the optical fibers or the secondary coatings comprise a layer of adhesive. This applies in particular to a further preferred embodiment in which the thickness of the layer of adhesive provided on the core is smaller than the diameter of the optical fiber or, in the presence of a secondary coating, is smaller than the diameter of the coated fiber. In the last embodiment the layer of adhesive does not extend to beyond the outside (circumferential edge) of the fibers or the secondary coatings. This prevents sticking which occurs when larger thicknesses of adhesive are used. The sticking is a serious technical problem in the further processing of the cable element in for example, twisting of multiple elements to form one optical cable and in the storage of cable elements on reels.

In still another embodiment, the optical fiber or the secondary coating is embedded in an SZ configuration in the layer of adhesive present on the core.

An SZ configuration is a known form for an optical fiber which presents optical and technological advantages as compared with a spiral form. An SZ form can perhaps best be described as a sine wave bent around the core. An SZ configuration is obtained by rotating a device for feeding optical fibers continuously over the surface of the core in the longitudinal direction thereof. The device is rotated periodically and alternately to the left and to the right over an angle of rotation of, for example, 360°. Instead of rotating the feeding device, it is alternatively possible to rotate the core periodically to the left and to the right.

In the element according to the invention, the optical fiber or secondary coating is provided in SZ form on the surface of the core by means of the permanently elastic adhesive. Due to the layer of adhesive, a direct fixation in SZ form is possible. Up till now an SZ form has been realized by providing grooves having an SZ configuration in the surface of the core and then laying optical fibers, without secondary coatings, in the grooves.

In yet another embodiment, a folded foil is provided around the core and the attached optical fiber. The foil is covered with a sheath of a synthetic resin.

As a result of fixing the fiber or the secondary coating to the core by means of the permanently elastic adhesive, a wound foil need not be used in the element according to the invention. The use of a folded foil has the practical advantage of a considerably increased speed of manufacture. In this connection it is to be noted that winding a foil is a laborious and slow process step. Folding a foil, that is to say longitudinally bending a foil, does not have this disadvantage. The foil is preferably a foil of a synthetic resin, for example a polyester foil or polyethylene foil which, if desired, may be metallized. The foil serves as a heat shield to protect the optical fibers upon providing the sheath.

The element according to the invention can be manufactured in a simple manner in a continuous process by providing on the core, over its whole length or periodically over a part of its length, a layer of adhesive. At the same time, optical fibers which may each have a separate secondary coating, are provided in the desired configuration on the surface of the core. Then, if desired, a foil is folded around the core with the attached fibers or secondary coatings. Finally, a synthetic resin sheath is extruded over the foil.

DESCRIPTION OF THE PREFERRED EMBODIMENTS

Figure 1:
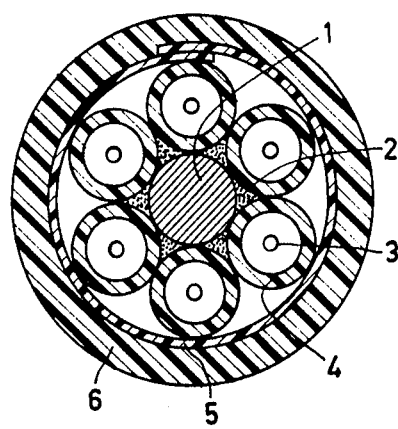
FIG. 1 is a cross-sectional view of an optical cable element according to the invention.

In the Figure, reference numeral 1 denotes a core which is formed by a steel litz wire. Over the whole circumference of the core 1 a layer 2 of a hot melt adhesive is provided. Six optical fibers 3 in SZ form are arranged around the core 1 over the layer of adhesive 2.

The fibers 3 each have a thickness of 100 $\mu$m and each comprise a primary coating of approximately 4 $\mu$m, not shown. Each fiber is surrounded by a separate secondary coating (tubular sheath) 4 of synthetic resin which is permanently elastically connected to the core 1 by means of a layer of adhesive 2. The secondary coating of synthetic resin has a thickness of approximately 0.6 millimeters and is manufactured from polyvinylidene difluoride.

A foil 5 of synthetic resin folded with overlapping edges is provided around fibers 3 with secondary coatings 4. The foil 5 is, in turn, surrounded by an extruded sheath 6 of synthetic resin which is manufactured from polyethylene.

What is claimed is:

1. An optical cable element comprising:
   a core strength member;
   an optical fiber wrapped around the core; and
   a layer of a permanently elastic adhesive connecting the fiber to the core.

2. An optical cable element as claimed in claim 1, characterized in that the adhesive is a permanently elastic hot melt adhesive.

3. An optical cable element as claimed in claim 2, characterized in that:
   the core has a surface; and
   the adhesive covers the entire surface of the core.

4. An optical cable element as claimed in claim 3, characterized in that:
   the optical fiber has a diameter; and
   the adhesive has a thickness which is less than the diameter of the fiber.

5. An optical cable element as claimed in claim 4, characterized in that the optical fiber is wrapped around the core in an SZ configuration.

6. An optical cable element as claimed in claim 2, characterized in that:
   the core has a surface; and
   the adhesive covers parts of the surface of the core which are separated by equal distances along the length of the core.

7. An optical cable element as claimed in claim 6, characterized in that:
   the optical fiber has a diameter; and
   the adhesive has a thickness which is less than the diameter of the fiber.

8. An optical cable element as claimed in claim 7, characterized in that the optical fiber is wrapped around the core in an SZ configuration.

9. An optical cable element as claimed in claim 1, characterized in that the cable element further comprises:
   a folded foil surrounding the fiber-wrapped core; and
   a sheet of synthetic resin surrounding the foil.

10. An optical cable element comprising:
    a core strength member;
    an optical fiber wrapped around the core;
    a tubular sheath enclosing the optical fiber, said sheath having an outer surface; and
    a layer of a permanently elastic adhesive connecting the outer surface of the sheath to the core.

11. An optical cable element as claimed in claim 10, characterized in that the adhesive is a permanently elastic hot melt adhesive.

12. An optical cable element as claimed in claim 11, characterized in that:

the core has a surface; and the adhesive covers the entire surface of the core.

13. An optical cable element as claimed in claim 12, characterized in that:

the tubular sheath has a diameter; and the adhesive has a thickness which is less than the diameter of the sheath.

14. An optical cable element as claimed in claim 13, characterized in that the optical fiber is wrapped around the core in an SZ configuration.

15. An optical cable element as claimed in claim 11, characterized in that:

the core has a surface; and the adhesive covers parts of the surface of the core which are separated by equal distances along the length of the core.

16. An optical cable element as claimed in claim 15, characterized in that:

the tubular sheath has a diameter; and the adhesive has a thickness which is less than the diameter of the sheath.

17. An optical cable element as claimed in claim 16, characterized in that the optical fiber is wrapped around the core in an SZ configuration.

18. An optical cable element as claimed in claim 10, characterized in that the cable element further comprises:

a folded foil surrounding the fiber-wrapped core; and a sheet of synthetic resin surrounding the foil.

* * * * *